May 7, 1940.  O. WITTEL  2,199,977
CONTROL ARRANGEMENT FOR FILM HANDLING APPARATUS
Filed Jan. 26, 1939
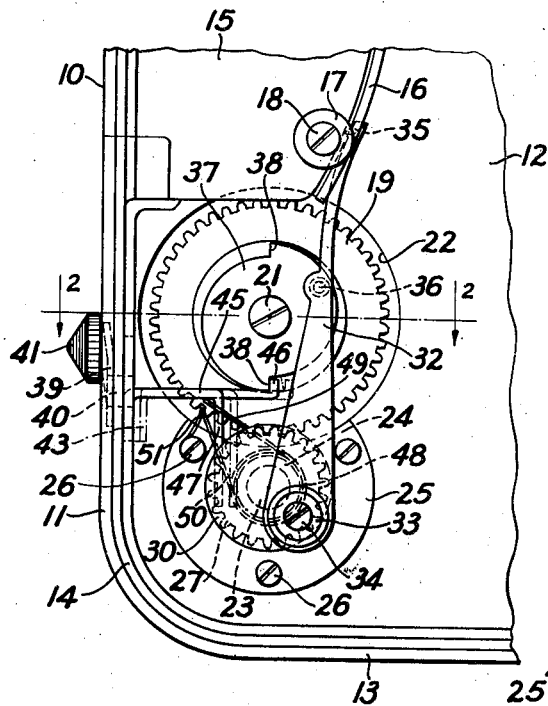
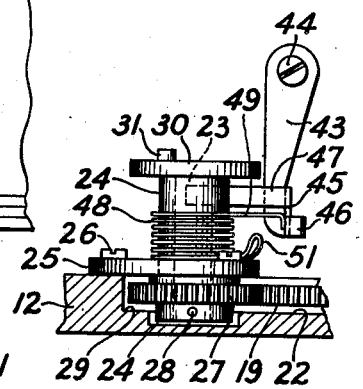
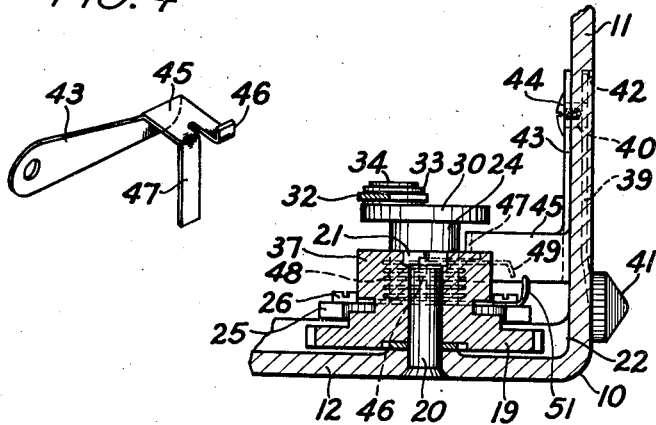
Otto Wittel
INVENTOR
BY Newton Perrins
George A. Gillett, Jr.
ATTORNEYS Patented May 7, 1940

2,199,977

UNITED STATES PATENT OFFICE 2,199,977

CONTROL ARRANGEMENT FOR FILM HANDLING APPARATUS

Otto Wittel, Rochester, N. Y., assignor to Eastman Kodak Company, Rochester, N. Y., a corporation of New Jersey Application January 26, 1939, Serial No. 252,953

10 Claims. (Cl. 192—139)

The present invention relates to a control arrangement for a film handling apparatus and more particularly to a control member for engaging a toothed member of a film-operating means and for resiliently opposing and stopping such toothed member.

The prior art discloses control members for film handling apparatus which stop the film-operating means of the apparatus with a resilient or shock-absorbing action. However, such control members utilize such resilient action exclusively to overcome the momentum of the operating means and if such resilient action is reduced, such as by fatigue of a spring member, the film-operating means is not immediately stopped and may even continue to operate against the resilient action of the control member. This objectionable condition is encountered particularly during high speed operation of a film handling apparatus, such as is used for taking "slow motion" pictures.

The primary object of the present invention is the provision in a film handling apparatus of a control arrangement wherein an engaging portion of the control member resiliently opposes movement of the film operating means and wherein an abutting portion of the control member is moved against a stationary abutment to limit the movement of the control member or to provide a subsequent positive stop for the film-operating means.

A further object of the invention is the provision of a control member, the inherent resiliency of which opposes movement of the film-operating means and which is mounted at one end only so as to provide a cantilever resilient arm which is flexed by the toothed member of the operating means.

Another object of the invention is the provision of a control member having an engaging portion and an abutting portion, which portions extend in opposite directions, the engaging portion being moved into engagement with the toothed member of a film-operating means and the abutting portion being normally spaced from a stationary abutment in the apparatus but being moved against such abutment to limit the flexure of the arm of the control member.

Other and further objects of the invention will be apparent to those skilled in the art from the following description.

The above and other objects of the invention are obtained by a control arrangement for a film handling apparatus, which control arrangement includes an abutment, a film-operating means including a movable toothed member, a control member having an engaging portion for engaging said toothed member to stop said operating means, said control member being arranged resiliently to oppose movement by said toothed member, and said control member having an abutting portion normally spaced from said abutment but moved thereagainst to limit the movement of said control member upon engagement of said engaging portion with said toothed member. The control member may be mounted from one end only so that the resilient resistance exerted by the control member against the moving toothed member of the operating means will be the inherent resiliency of the cantilever control arm. Furthermore, the abutment and toothed member of the operating means are preferably mounted in spaced relation and the engaging and abutting portions of the control member extend into opposite directions therefrom.

Reference is now made to the accompanying drawing wherein similar reference characters designate similar elements and wherein:

Fig. 1 is a fragmentary side elevation of a film handling apparatus equipped with the control arrangement of the invention.

Fig. 2 is a transverse cross section of the control arrangement taken on the line 2—2 of Fig. 1.

Fig. 3 is a fragmentary rear elevation of the control arrangement as viewed from the right of Fig. 1.

Fig. 4 is a perspective of the control member according to the invention.

The control arrangement of the invention is illustrated in connection with a motion picture camera mechanism but it is to be understood that the invention may also be equally well applied to all types of film-handling apparatus. In the illustrated embodiment, the film handling-apparatus comprises a camera casing 10 having a front wall 11, a side wall 12 and a bottom wall 13. The front wall 11 and bottom wall 13 may have a rim 14 extending along the outer edges thereof and for light-tight co-operation with a cover, not shown. The casing 10 also encloses a shutter housing 15 which has a curved rear wall against which the film may be pressed by a pressure pad 16. A film edge-guiding member 17 is mounted upon shutter housing 15 by a screw 18.

The film-operating means may be of conventional design and includes a toothed member. Specifically, the film-operating means includes a pinion gear 19 mounted upon a shaft 20 by a screw 21 and located within a circular recess 22 in the side wall 12 of casing 10. A shaft 23 is journaled in a bearing sleeve 24 which is fastened to side wall 12 by an integral flange 25 and a plurality of screws 26. A small pinion 27 is fastened by a pin 28 to the inner end of shaft 23, rotates within a stepped circular recess 29 in side wall 12, and meshes with said pinion gear 19. A disk 30 is fastened to the other end of shaft 23 and carries an eccentric pin 31 upon which one end of the pulldown claw 32 is journaled by means of a bushing 33 and a screw 34. The other end of pulldown claw 32 has a tooth 35 extending through a slot in pressure pad 16 for engagement with the film at the film gate. Said claw 32 is resiliently pressed toward pressure pad 16 such as by a spring, not shown, bearing upon a stud 36 provided centrally on claw 32.

A toothed member is included in and is connected for movement with the aforementioned film-operating means. Such a toothed member may comprise a disk 37 which is integral with or attached to said pinion gear 19, which is mounted for rotation with gear 19 upon shaft 20, and which has a pair of teeth 38. The film-operating means may be driven in any conventional manner such as by a spring motor, not shown, which may be connected to gear 19 or gear 27.

A release member is externally and movably mounted on the casing 10. Such a release member comprises a lever 39 mounted at one end on a stud 40 journaled in casing front wall 11 and carrying upon its other end a finger-piece 41. The front wall 11 of casing 10 is recessed as at 42 to permit movement of lever 39 from a running position to a stop position.

A control member is connected for movement with said release member. The control member, according to the invention, comprises an arm 43 connected at one end to stud 40 by a screw 44 and includes a perpendicular flange 45 on which are carried oppositely extending tongues, an engaging tongue 46 and an abutting tongue 47.

A resilient member acts upon the aforementioned control member to urge it into engaging or stop position and also resiliently to hold said control member in its running position. Such a resilient member is, according to the invention, mounted upon the bearing sleeve which also serves as the abutment for tongue 47. Preferably this resilient member comprises a coil spring 48 encircling bearing sleeve 24, having one end 49 extending into engagement with the control member or flange 45 thereof, and having another end 50 provided with a bend 51 and then fastened under one of screws 26. It will be clear that the end 49 of spring 48 normally urges the control member and its engaging tongue 46 into engagement with the teeth 38 of disk 37 and also that when the control member is moved to its extreme running position the edge of flange 45 will snap over the bend 51 in the other end 50 of coil spring 48 resiliently to hold the control member in such running position.

The operation of the control arrangement, according to the invention, will now be described. Prior to operation the control arrangement is in the position shown by the full lines in Fig. 1. Upon downward movement of finger-piece 41, the control member and its engaging tongue 46 will be moved out of engagement with the tooth 38 of disk 37 and the film-operating mechanism will then run in a well known manner. If any appreciable run is desired, the finger piece 41 may be moved to its extreme position so that the edge of flange 45 will engage bend 51 in spring end 50 in the manner just described.

When it is desired to stop the film-operating mechanism, the finger-piece 41 will be moved upwardly to disengage flange 45 from bend 51 or will be released to permit spring end 49 to raise the control member whereupon the engaging tongue 46 is moved into the path of the teeth 38 of the toothed member. The impact of such engagement between a tooth 38 and engaging tongue 46 will flex or spring arm 43 of the control member and will tend to stop the rotation of the toothed member and the operation of the film-moving means. The cantilever mounting of arm 43 contributes to such flexure of the arm transversely of its plane of movement for controlling the engagement of tongue 46 with the toothed member. In order to insure that the control member will not flex too much, an abutment is provided so as to limit the flexure of the control. Such abutment may be provided in various ways within or on casing 10 but specifically according to the invention may also be provided by the bearing sleeve 24 for the lower shaft 23. As a result, flexure of arm 43 by the toothed member is limited to the normal spacing of abutting tongue 47 from said bearing sleeve 24. In other words, when tongue 46 and arm 43 have moved to the position shown in dot-dash lines in Fig. 1, the abutting tongue 47 will bear against sleeve 24 and prevent further flexure of the control member. Thus the arm 43 is prevented from being flexed beyond its elastic limit or to such an extent that the engaging tongue 46 will slip off of the engaged tooth 38. In this manner the toothed member and the film-operating means will first be stopped by a shock-absorbing action to prevent any severe shocks to the film-operating mechanism and its related parts and the tooth member is then positively stopped when the abutting tongue 47 is moved against the bearing sleeve 24 or any other stationary abutment within the casing 10.

The ultimate position of the control member during its stop position will depend upon the relative resilient resistance of or exerted by said control member. Said resilient resistance of the control member may be sufficient to reverse disk 37 and to return the control member to the full line position shown in Fig. 1, or at least partially to so return the control member. In either event some back-lash is placed in the film-operating means to reduce the starting load upon the driving motor for the next operation. Even if the control member is of such low resiliency as to be held in flexed position by a tooth 38, that resiliency will be sufficient to return the control member to normal position when the engaging tongue 46 is disengaged from tooth 38 and said resiliency will exert its shock-absorbing action upon the next engagement of tooth 38 and tongue 46.

Since other modifications of the invention are possible, the present disclosure is to be construed in an illustrative and not in a limiting sense. The scope of the invention is defined in the claims which follow.

Having now particularly described my invention what I desire to secure by Letters Patent of the United States and what I claim is:

1. In a film handling apparatus, the combination with a casing having a stationary abutment, and an operating means including a movable toothed member, of a control member on said casing and having an engaging portion for engaging said toothed member to stop said operating means, the force of the impact of such engagement being partially absorbed by a resilient resistance exerted by said control member, and an abutting portion on said control member normally spaced from said stationary abutment and moved thereagainst to limit the movement of said control member upon engagement of said engaging portion with the moving toothed member.

2. In a film handling apparatus, the combination with a casing having a stationary abutment, and an operating means including a movable toothed member, of a control member on said casing and having an engaging portion for engaging said toothed member to stop said operating means, the force of the impact of such engagement being partially absorbed by the inherent resiliency of said control member which is flexed, and an abutting portion on said control member normally spaced from said stationary abutment and moved thereagainst to limit the flexure of said control member upon engagement of said engaging portion with the moving toothed member.

3. In a film handling apparatus, the combination with a casing having an abutment, an operating means including a movable toothed member, and a release member movable from a running position to a stop position, of a control member movable with said release member, having an engaging portion for engaging said toothed member and being moved thereby when said release member is moved to stop position, and having an abutting portion normally spaced from said abutment and moved thereagainst to limit the movement of said control member by engagement of said engaging portion with said toothed member, and a spring member mounted on said abutment, having one part normally moving said control member so that the engaging portion thereon engages said toothed member, and having another part with a bend therein for engaging and holding said control member so that said engaging portion thereon is out of engagement with said toothed member.

4. In a film handling apparatus, the combination with a casing having an abutment, an operating means including a movable toothed member, and a release member movable from a running position to a stop position, of a control member comprising an arm connected to said release member and supported at one end only, and a pair of tongues on the unsupported end of said arm, one of said tongues engaging said toothed member when said release member is in stop position, and the other of said tongues being normally spaced from said abutment but moved thereagainst to limit the flexure of said arm when the first-mentioned tongue moves into engagement with and stops the moving toothed member.

5. In a film handling apparatus, the combination with a casing having an abutment, an operating means including a movable toothed member, and a release member movable from a running position to a stop position, of a control member comprising an arm supported at one end only, movable by said release member in a plane, and flexible only transversely of its plane of movement, and a pair of tongues on the unsupported end of said arm, one of said tongues engaging said toothed member when said release is in stop position, and the other of said tongues being normally spaced from said abutment but moved thereagainst in a plane transverse to said plane of movement when the first-mentioned tongue moves into engagement with the moving toothed member and is moved transversely of the plane of movement of said arm.

6. In a film handling apparatus, the combination with a casing including a bearing sleeve, and a film operating means including a shaft journaled in said sleeve and including a toothed member adjacent to said sleeve, of a control member comprising an arm supported at one end only, an engaging tongue and an abutting tongue on the unsupported end of said arm, said abutting tongues being normally spaced from said sleeve but moved thereagainst to limit the flexure of the arm of said control member upon engagement of said engaging tongue with said toothed member.

7. In a film handling apparatus, the combination with a casing including a bearing sleeve, and a film operating means including a shaft journaled in said sleeve and including a toothed member in spaced relation to said sleeve, of a control member comprising an arm supported at one end only, and a pair of oppositely extending tongues on the unsupported end of said arm, one of said tongues being normally spaced from said sleeve but moved thereagainst to limit the flexure of said arm upon engagement of the first-mentioned tongue with said moving toothed member.

8. In a film handling apparatus, the combination with a casing including a bearing sleeve, and a film operating means including a shaft journaled in said sleeve and including a toothed member in spaced relation to said sleeve, of a control member comprising an arm supported at one end only, a perpendicular flange on the unsupported end of said arm, and a pair of oppositely extending tongues on said flange, one of said tongues being normally spaced from said sleeve but being moved thereagainst to limit the flexure of said arm upon engagement of the first-mentioned tongue with said moving toothed member.

9. In a film handling apparatus, the combination with a casing including a bearing sleeve, and a film operating means including a shaft journaled in said sleeve and including a toothed member adjacent to said sleeve, of a control member comprising an arm supported at one end only, an engaging tongue and an abutting tongue on the unsupported end of said arm, said abutting tongue being normally spaced from said sleeve but moved thereagainst to limit the flexure of the arm of said control member upon engagement of said engaging tongue with said toothed member, and a coil spring encircling said bearing sleeve, having one end engaging said control member normally to urge said engaging tongue into engagement with said toothed member, and having a bend in the other end thereof for engaging an edge of said arm to hold said control member with said engaging tongue out of engagement with said toothed member.

10. In a film handling apparatus, the combination with a casing including a bearing sleeve, a film operating means including a shaft journaled in said sleeve and including a toothed member mounted in spaced relation to said sleeve, and a release member externally and movably mounted on said casing, of a cantilever control member connected at one end to said release member and including at its other end a pair of oppositely extending tongues, one of which is arranged to engage said toothed member when said release member is moved to stop position whereby said cantilever control member is flexed, and the other tongue of which is arranged to be normally spaced from said sleeve but moved thereagainst to limit flexure of said cantilever member, and a resilient member mounted on said sleeve, having one end engaging said control member to urge it into said stop position and having a bent portion at its other end for engaging and maintaining said control member in running position.

OTTO WITTEL.